Patented July 18, 1950

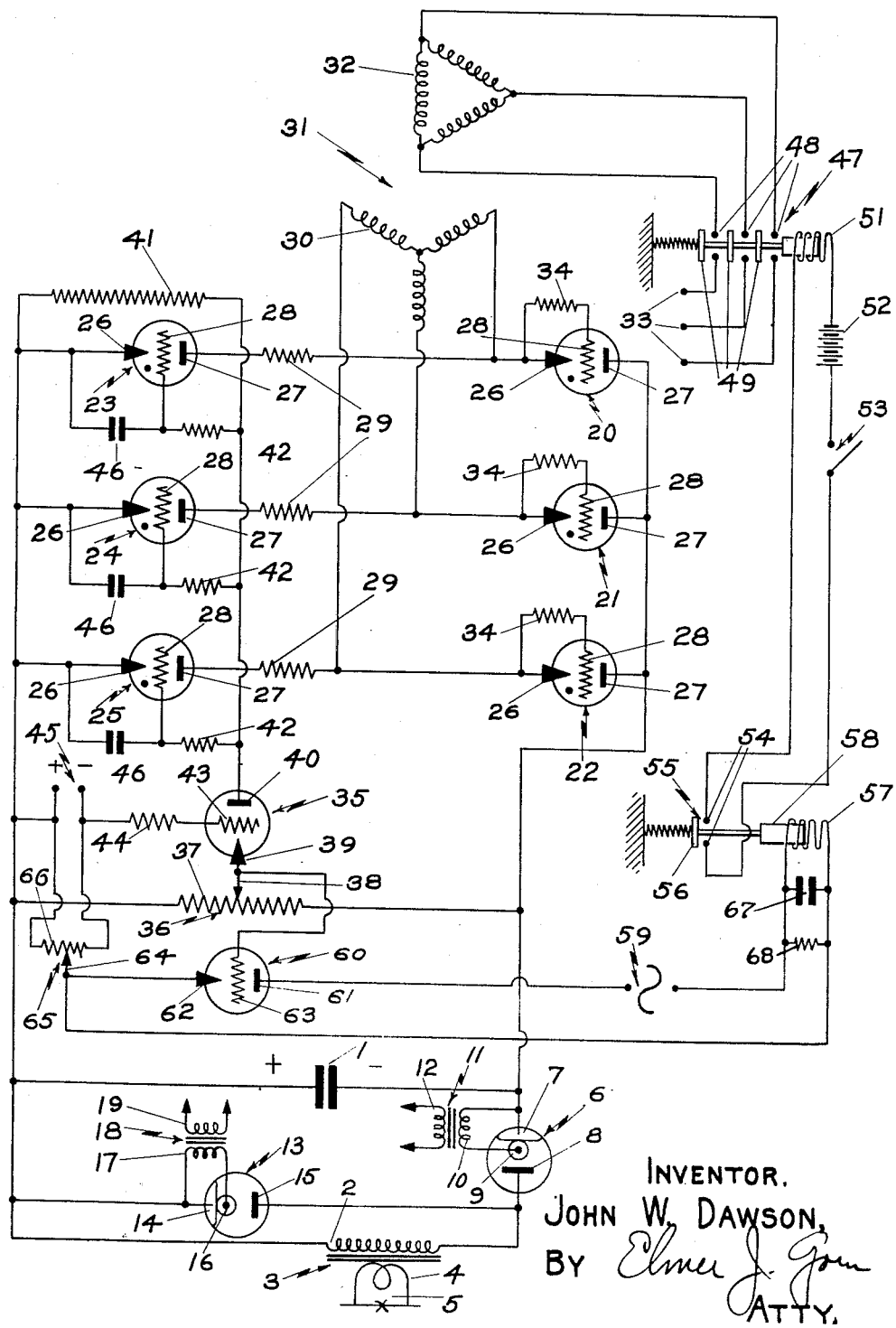

2,515,635

UNITED STATES PATENT OFFICE 2,515,635

CONDENSER CHARGING SYSTEM

John W. Dawson, West Newton, Mass., assignor to Raytheon Manufacturing Company, Newton, Mass., a corporation of Delaware Application April 28, 1942, Serial No. 440,819

16 Claims. (Cl. 219—4)

This invention relates to condenser charging systems, and particularly to such systems in which the charging current is supplied from an alternating current line through a rectifier which is capable of overcharging the condenser.

In certain condenser charging systems it is desirable that the condenser be charged rapidly. For example, in condenser welding systems, particularly seam welding systems, it is desirable that the welds follow each other rapidly. In these systems the welding current is supplied by the discharge of condensers. It is desirable that the condensers be charged rapidly. For this purpose the maximum charging voltage available is preferably well above the maximum charging rating of the condensers so as to prevent slow charging of the condenser at near its maximum voltage rating. The charging voltage is usually obtained from a rectifier, such as for example a rectifier employing grid control rectifying tubes as described in my application for Condenser Welding System, Serial No. 312,712, filed January 6, 1940, now Patent No. 2,483,691, dated Oct. 4, 1949. To provide for the proper charging of the condenser, regulators are employed with such rectifiers which are adapted to control the charging current by applying a cut-off bias to the grids of the rectifying tubes. Since the rectifying tubes are preferably of the gas or vapor-filled type, these tubes cannot instantly be brought under control while conducting and therefore while charging at their full rate the normally-delivered charge increment of one of said tubes may cause overcharging. With certain welding loads the amount of charge on the welding condensers is critical. Any overcharge on the condensers, even if only a relatively small percentage of a total charge thereon, may produce irreparable damage, such as for example by burning a hole in the material to be welded. It is therefore highly desirable to prevent overcharging of the condensers and for this purpose a regulator such as that described in my hereinabove mentioned copending application may be used which finishes the charging operation in small increments. Such regulators may, however, fail to prevent a certain amount of overcharging. As a result, improper welds or damage to the material to be welded may be produced. Furthermore, if condensers are charged close to their maximum rating from rectifiers capable of applying voltage substantially over the maximum voltage rating for said condensers, the condensers may be damaged. Therefore, an object of the present invention is to provide means for preventing any substantial overcharging of the condensers.

Another object of this invention is to provide a protective means which operates to disconnect the condensers to be charged at a preselectable amount in excess of the voltage for which the charging regulator is set.

In certain welding systems, upon the discharge of the condenser through the welding load, which usually contains a substantial amount of inductance, the potential across said condenser tends to reverse. If the tubes of the rectifier which supply charging current to the condenser are conducting at the time of this potential reversal, this reversal of potential will tend to cause an extremely large current to flow through said rectifying tubes. This current tends to burn out said tubes. Therefore, it is another object of this invention to provide means for limiting said current.

Other and further objects and advantages of this invention will become apparent and the foregoing will be best understood from the following description of an exemplification thereof, reference being had to a drawing in which the figure is a schematic diagram of a condenser welding system embodying this invention.

Referring to the figure, a condenser 1 is adapted to be charged, and in accordance with my invention means are provided for preventing overcharging of said condenser. The energy stored in condenser 1 may be used for any suitable purpose, such as for example to supply energy for performing welding operations. Referring to the system illustrated in the drawing, the energy stored in condenser 1 may be supplied to primary 2 of the welding transformer 3 having its secondary 4 connected to a welding load 5. The condenser 1 may be connected to the primary 2 through a controlled ignition tube 6 having a mercury pool type cathode 7 connected to the negative side of the condenser 1 and having its anode 8 connected to one side of the primary 2. The other side of the primary 2 is connected to the positive side of condenser 1. In order to fire tube 6, it is provided with any suitable igniting electrode 9. Igniting impulses may be supplied to the igniting electrode 9 through the secondary winding 10 of an igniting transformer 11, which has its primary 12 connected to a suitable source of igniting impulses.

To provide for exponential decay of the current in the primary winding 2 of the welding transformer, another controlled ignition tube 13 may be arranged in shunt across said winding.

Tube 13 may be similar to tube 6 and may be provided with a mercury pool type cathode 14 connected to the end of the primary winding which is connected to the positive side of condenser 1. The anode 15 of tube 13 is connected to the other side of said primary winding. Tube 13 may be provided with an igniting electrode 16 which is supplied with igniting impulses through the secondary winding 17 of igniting transformer 18, which has its primary winding 19 connected to a suitable source of igniting impulses. When tube 6 fires, condenser 1 discharges into the primary. The potential across said primary rapidly declines as the current through said primary rises. When the potential across the primary has declined to zero, due to the inductance associated with said primary winding, the current continues to flow but the potential across said winding reverses. Tube 13 is adapted to be fired upon such reversal.

The charging current for condenser 1 may be supplied from a plurality of controlled rectifying tubes 20—25. These tubes may be of the gas or vapor-filled type having a control grid for determining the initiation of the discharge during a period when the anode is positive. Each of these tubes 20—25 is preferably provided with a cathode 26 of the permanently energized type, such as a thermionic filament, an anode 27, and a control grid 28. These tubes may be arranged in two banks, the right hand bank as viewed in the drawing consisting of tubes 20, 21 and 22 and the left bank consisting of tubes 23, 24 and 25. The tubes in the right bank are in series with the tubes in the left bank and both banks are in series with condenser 1. This arrangement serves to reduce possible damage to said tubes due to reverse voltages. The anodes of tubes 20, 21 and 22 are connected together and to the negative side of condenser 1, while the cathodes of tubes 23, 24 and 25 are connected together and to the positive side of condenser 1. The cathodes of tubes 20, 21 and 22 are connected through separate resistances 29 to the anodes of tubes 23, 24 and 25, respectively.

The function of resistances 29 will be understood from the following. In this system the ratio of inductance to resistance in the discharge circuit of condenser 1 is such that the discharge of condenser 1 is not critically damped, but instead tends to be oscillatory. The potential across condenser 1 will, therefore, reverse as the condenser discharges. The reversal of potential across condenser 1 tends to produce a current through the rectifying tubes and this current tends to be of an extremely high order of magnitude sufficient to damage said tubes and the equipment associated with them. The resistances 29 serve to limit this current. These resistances preferably have a low value, such as for example 10 ohms, so that only a small and negligible amount of the charging energy is dissipated therein. However, despite their relatively small value, they do substantially limit the current flowing through the rectifying tubes when potential of condenser 1 reverses, since the reversed potential on the condenser is relatively small, and preferably only as large as is necessary to reliably initiate conduction in the shunt ignition-type tube 13. For example in one particular instance where the condenser was charged to 3000 volts, the reversed potential was of the order of 100 volts. The rectifying tubes are fed from a source of multiple-phase alternating current by connecting the cathodes of tubes 20, 21 and 22 to the outer ends of the phase windings of the Y-connected secondary winding 30 of a charging transformer 31 having a delta connected primary winding 32. The primary winding 32 is connected to terminals 33 which are adapted to be connected to a suitable three-phase alternating current supply line.

As stated hereinbefore, it is desired that the condenser be charged at a rapid rate. In the system thus far described the charging rate is primarily controlled by the amount of inductance built into the charging transformer. However, the constants of the rectifying circuit are such as to be capable of rapidly charging condenser 1, and consequently are capable of overcharging said condenser. Therefore, it is essential to provide means for regulating the amount of charge supplied to said condenser. These regulating means may cut off the rectifying current or diminish the rate of supply of the rectifying current by applying a cut-off bias to the grids of the rectifying tubes. Since, however, the tubes in the right bank and the left bank are in series with each other and since, as may be seen, charging current for the condenser must pass through not only one tube in the right bank, but also one tube in the left bank, before it can be supplied to the condenser, it becomes unnecessary to control more than the grids of one bank of these tubes. Therefore, the control grids 28 of tubes 20, 21 and 22 may be connected to the cathodes of said tubes through suitable resistances 34 so that said tubes will conduct whenever the anode potential thereon is positive. Regulation of the charging current is controlled by controlling the grid bias on the tubes in the left bank.

In supplying a controlling voltage to the grids of tubes 23, 24 and 25, I prefer to provide a high vacuum rectifying tube 35. The operation of tube 35 is made responsive to the potential across condenser 1 and for this purpose a potentiometer 36 is provided having the ends of its resistance 37 connected across condenser 1 and having the movable arm 38 of the potentiometer connected to the cathode 39 of tube 35. The cathode 39 may be of the permanently energized type. The anode 40 of tube 35 is connected through an anode resistance 41 to the positive side of condenser 1. The anode 40 is also directly connected to grid resistors 42 of the control grids 28 of tubes 23, 24 and 25 to thereby prevent the initiation of discharges in said tubes when the anode potential thereon next becomes positive. Since said cut-off bias is to be provided only when condenser 1 has been charged to a predetermined level, tube 35 is preferably arranged so that it does not conduct until said predetermined level has been reached. For this purpose tube 35 has its grid 43 connected through a suitable grid resistor 44 to the negative terminal of a source of direct current potential 45, the positive terminal of said source 45 being connected to the side of the resistance 37 of potentiometer 36, which is connected to the positive side of condenser 1. Thus, the positive side of said source of direct current potential is connected through a portion of resistance 37 of potentiometer 36 and through arm 38 of said potentiometer to the cathode 39 of tube 35. The value of said source of potential is such that, with no charge on condenser 1, a cut-off bias is applied to the grid 43 of said tube and, therefore, said tube does not conduct. However, as the charge on condenser 1 increases, a potential drop is produced across resistance 37 of potentiometer 36, the left side of said resistance being positive in potential relative to the right side thereof. Thus, a potential is produced between the cathode 39 and the grid 43 of tube 35 which opposes the potential of the source of direct current. The source of direct current therefore operates as a target or reference potential and when the potential produced across the portion of the resistance 37 connected between grid 43 and cathode 39 reaches a sufficient value relative to that of said target potential, tube 35 will conduct. When tube 35 conducts, as has been explained hereinbefore, a negative bias is applied to the grids of tubes 23, 24 and 25. A small by-pass condenser 46 may be connected between said grids and the cathode of said tubes.

The anode voltage for tube 35 is derived from condenser 1 and it will be seen that since the charge on said condenser also determines the anode potential, said condenser must be charged to a substantial level before tube 35 is ready to conduct, regardless of the grid bias on tube 35.

In order to make a satisfactory weld it is desirable that a predetermined level of energy be supplied to the material to be welded during each welding impulse. The material 5 may be critical as to the value of energy that may be applied thereto during each welding impulse. If the amount of energy is above said critical value, burning or spattering of said material at the welding point may occur. Since the welding energy is derived from condenser 1 the charge on said condenser is critical. Furthermore, this critical value varies with the welding load. Therefore, I have provided means for varying the amount of charge on said condenser. It will be seen that by adjusting the potentiometer arm 38, tube 35 can be adjusted so as to conduct at a higher or lower level of charge on said condenser, tube 35 being controlled by the voltage to which said condenser is charged. Conduction of tube 35 in turn shuts off the supply of charging current from the rectifying tubes. Therefore, by adjusting potentiometer arm 38, the amount to which condenser 1 will be allowed to be charged by the regulating system is selected.

The regulating system hereinabove described is adapted to prevent overcharging of condenser 1. However, as previously pointed out, the rectifier is capable of overcharging said condenser and if the regulator fails the condenser may be greatly overcharged with deleterious consequences hereinbefore mentioned. The overcharging may be due to failure of the regulating means or to a defect in one of the rectifying tubes. However, even if the rectifying tubes are without defects, failure to prevent overcharging may be due to the fact that after such gaseous rectifying tubes have been conducting heavy currents they become highly ionized and a greater negative voltage on their grids is required to prevent them from conducting. Since the voltage regulator may be adjusted to supply a voltage lower than the increased cut-off requirements of the grids under these conditions, the rectifying tubes may continue to conduct. Since the condenser is adapted to be charged to a voltage close to its maximum rating and since the possibility of damage from overcharging increases rapidly as the voltage increases, it is important to eliminate the possibility of the condenser being charged to more than a few percent over the voltage for which the regulator is set.

For the aforementioned purpose, I prefer to provide a self-opening holding relay 47 having three separate pairs of contacts 48 interposed between each of the terminals 33 and the primary winding 32 of charging transformer 31, and three separate arms 49 each adapted to connect a pair of said contacts 48. When current passes through the coil 51 of the relay 47, the arms 49 are adapted to connect their contacts. However, when no current is passing through said coil 51, the arms 49 automatically move away from their contacts and the primary winding 32 of the charging transformer 31 is disconnected from terminals 33.

In order to provide current for the coil 51 of relay 47, a suitable source of direct current 52 may be provided. The source 52 may be connected to coil 51 in series with a manually-operable switch 53 and with the contacts 54 of another relay 55. When switch 53 is closed and the arm 56 of relay 55 makes contact with its contacts 54, current is supplied to the coil 51 which closes relay 47. Relay 55 is preferably also of the self-opening type and is adapted to be closed by supplying current to the coil 57 of said relay which thereby closes the relay. In normal operation current is to be supplied to coil 57 continuously except when condenser 1 is overcharged or when there is some other failure in the system. For supplying current to said coil a pair of terminals 59 may be provided which are adapted to be connected to a suitable source of current supply, for example an alternating current line. To control the current supplied to said coil 57 and to rectify it, I prefer to provide a rectifying tube 60 having its anode 61 connected to one of the terminals 59 and its cathode 62, preferably of the permanently energized type, connected to one end of coil 57, the other end of coil 57 being connected to the other terminal 59. Tube 60 is preferably of the vacuum type and is provided with a control grid 63 connected to arm 38 of potentiometer 36. The cathode 62 of said tube is in turn connected to the arm 64 of a potentiometer 65, whose resistance 66 is connected across the source of direct current potential 45.

It will be seen that during halves of the alternating current cycle, when current is supplied from the alternating current source 59, anode 61 of tube 60 will become positive. Tube 60 is therefore ready to conduct and will conduct if the bias on grid 63 is not negative. A reference bias potential for grid 63 is supplied from the terminals 45 connected to the source of direct current potential and is derived by connecting the cathode 62 of said tube to the arm 64 of potentiometer 65, the ends of the resistance 66 of said potentiometer being connected to terminals 45. The positive side of said source of direct current potential is connected to grid 63 through a portion of the resistance 37 of potentiometer 36. It will be seen that when there is no charge on condenser 1, the bias on grid 63 will be determined by the source of direct current potential and the adjustment of arm 64 of potentiometer 65. As the charge on condenser 1 increases, a negative bias opposing the positive bias of the source of direct current potential is interposed in series with the latter bias. As the charge on condenser 1 builds up, this opposing negative bias increases until a predetermined level of charge has been supplied to condenser 1 whereupon the negative bias becomes sufficiently negative to overcome the positive bias and to prevent further conduction through tube 60. When tube 60 ceases to conduct, current no longer flows through coil 57 of relay 55 and said relay opens. The opening of relay 55 in turn opens relay 47 and disconnects the primary 32 of the charging transformer 31 from the input terminals 33. By adjusting arm 64 of potentiometer 65, the system may be so adjusted that when condenser 1 becomes but slightly overcharged, tube 60 will cease to conduct, and thereby cause the main current supply to be cut off. Since the source of current for holding the coil 57 is alternating, it is preferred to provide means for supplying current to said coil during the half cycles in which tube 60 is not conducting to prevent opening of its contacts during said half cycles. For this purpose, I prefer to provide a condenser 67 arranged across said coil 57, said condenser being adapted to be charged during the half cycle in which tube 60 conducts and threafter supplying current by discharging during the half cycle in which tube 60 does not conduct. In order to provide for the more rapid discharge of condenser 67 so that when tube 60 is cut off by negative bias on its grid, current will no longer flow through coil 57, a resistance 68 is arranged across condenser 67, said condenser being adapted to discharge through said resistance.

It will be seen that only when tube 60 is conducting will the primary 32 of the charging transformer be connected to the main power supply line terminals 33. When, however, condenser 1 becomes overcharged or if there is any normal type of failure of tube 60 in its operation, current will no longer be supplied to coil 57 and consequently, as explained hereinabove, the primary winding 32 of the charging transformer 31 will be disconnected from the main power supply line terminals 33.

It will therefore be seen that I have provided overcharging protective means which only permit charging of the condenser to a small margin above the voltage to which the voltage regulator is set. It will also be seen that I have provided means whereby the ordinary types of failures of any of the electronic tubes in the entire system will not cause failure of the over-voltage protective system. For example, if tube 60 breaks down and no longer conducts, relay 55 will open and cause relay 47 to open and disconnect the main current supply line from the charging system.

This protective system including tube 60 may be adjusted quite accurately to disconnect the main current supply line upon a slight overcharge of condenser 1. For example, in actual practice in one condenser charging system where the condensers were adapted to be charged within a selectable range of from 1300 to 3000 volts, relays connecting the charging system to the main current supply line have been reliably opened up whenever the condenser of said system has been charged from 1% to 3% above a selected voltage level.

As has been explained hereinabove, the level to which the regulating means permits condenser 1 to be charged can be selected by adjusting the position of potentiometer arm 38. Since, however, arm 38 is also connected to the control grid 63 of tube 60, a change in position of arm 38 will also change the point at which tube 60 ceases to conduct and cause the main line relay 47 to open. The potentiometer arm 38 is thus so arranged that when its position is changed the regulating means and the protective system are both simultaneously and correspondingly adjusted. Thus if arm 38 is set so that the regulating means permits charging of condenser 1 to any selected level, the protective system will be correspondingly set to disconnect at a slight overcharge above said level; therefore it will be seen that the shifting of arm 38 does not change the margin between the level to which the regulating means is adjusted and the level at which the protective system is adjusted, both levels changing simultaneously and correspondingly. However, it will also be seen that this margin can be changed by adjusting arm 64 of potentiometer 65. By adjusting arm 64 this margin may be made smaller or larger, the margin selected depending upon various conditions of operation and the specific apparatus employed. The margin selected remains substantially constant regardless of the position of potentiometer arm 38 and the working voltage to which the regulating system is thereby set. Because the protective system is capable of operating within comparatively small limits, the margin that can be selected may be such that the overcharge on the condser, before the main current supply is cut off by the protective system, is small enough to be negligible.

It will also be seen that I have provided means for preventing extremely high surges of current through the rectifying tube due to the reversal of potential across the condenser which said rectifying tubes are charging.

While I have described the specific details of one embodiment of my invention, it will be apparent that numerous changes may be made without departing therefrom. For example, I have herein described a rectifier designed to rectify current from a three-phase alternating current line. It will be obvious that my invention may be applied to systems employing single phase or other multi-phase sources of current supply. I have also described herein specific types of relays and it will also be obvious that numerous other types of relays may be employed which function similarly. From the foregoing description numerous other possible forms of my invention will suggest themselves to those versed in the art and therefore it is desired that the appended claims be given a broad interpretation commensurate with the scope of this invention within the art.

What is claimed is:

1. A condenser charging system comprising a condenser, a source of current for charging said condenser, means for connecting said source of current to said condenser and controlled means for actuating said connecting means, said controlled means comprising a source of current for actuating said connecting means, a rectifying tube for connecting said last-mentioned source of current to said connecting means, said tube including a control grid, and means for deriving a potential from the charge on said condenser for biasing said grid, the derived potential varying with the charge on said condenser and being adapted to cut off conduction in said tube when the charge on said condenser reaches a predetermined level.

2. A condenser charging system comprising a condenser, a source of alternating current, a rectifier adapted to charge said condenser, means for connecting said source of alternating current to said rectifier, and controlled means for actuating said connecting means, said controlled means being responsive to the charge on said condenser and being adapted to operate when the charge on said condenser is below a predetermined level, said controlled means comprising a source of current for actuating said connecting means, a rectifying tube for connecting said last-mentioned source of current to said connecting means, said tube including a control grid, and means for deriving a potential from the charge on said condenser for biasing said grid, the derived potential varying with the charge on said condenser and being adapted to cut off conduction in said tube when the charge on said condenser reaches a predetermined level.

3. A condenser charging system comprising a condenser, a source of alternating current, a rectifier adapted to charge said condenser, means for regulating the charge on said condenser, means for connecting said source of alternating current to said rectifier, said connecting means being normally inoperative and controlled means for actuating said connecting means, said controlled means being responsive to the charge on said condenser and being adapted to operate when the charge on said condenser is below a predetermined level, said controlled means comprising a source of current for actuating said connecting means, a rectifying tube for connecting said last-mentioned source of current to said connecting means, said tube including a control grid, and means for deriving a potential from the charge on said condenser for biasing said grid, the derived potential varying with the charge on said condenser and being adapted to cut off conduction in said tube when the charge on said condenser reaches a predetermined level.

4. A condenser charging system comprising a condenser, a source of alternating current, a rectifier adapted to charge said condenser, means for connecting said source of alternating current to said rectifier, said connecting means being normally inoperative and controlled means for actuating said connecting means, said controlled means being responsive to the charge on said condenser and being adapted to operate when the charge on said condenser is below a predetermined level, said controlled means comprising a source of alternating current for actuating said connecting means, a rectifying tube for rectifying and connecting said last-mentioned source of current to said connecting means, said tube including a control grid, and means for deriving a potential from the charge on said condenser for biasing said grid, the derived potential varying with the charge on said condenser and being adapted to cut off conduction in said tube when the charge on said condenser reaches a predetermined level.

5. A condenser charging system comprising a condenser, a source of alternating current, a rectifier adapted to charge said condenser, means for connecting said source of alternating current to said rectifier, said connecting means being normally inoperative and controlled means for actuating said connecting means, said controlled means being responsive to the charge on said condenser and being adapted to operate when the charge on said condenser is below a predetermined level, said controlled means comprising a source of alternating current for actuating said connecting means, a rectifying tube for rectifying and connecting said last-mentioned source of current to said connecting means, said tube including a control grid, a reference potential for positively biasing said grid to cause said tube to conduct, and means for deriving a potential from the charge on said condenser for biasing said grid in a vectorial direction opposite to said reference potential, the derived potential varying with the charge on said condenser and being adapted to cut off conduction in said tube when the charge on said condenser reaches a predetermined level.

6. A condenser charging system comprising a condenser, a source of alternating current, a rectifier adapted to charge said condenser, a self-opening relay for connecting said source of alternating current to said rectifier, and controlled means for closing said relay, said controlled means being responsive to the charge on said condenser and being adapted to operate when the charge on said condenser is below a predetermined level, said controlled means comprising a source of alternating current for closing said relay, a rectifying tube for rectifying and connecting said last-mentioned source of current to said relay, said tube including a control grid, and means for deriving a potential from the charge on said condenser for biasing said grid, the derived potential varying with the charge on said condenser and being adapted to cut off conduction in said tube when the charge on said condenser reaches a predetermined level.

7. A condenser welding system comprising a welding load, a condenser adapted to supply welding energy to said welding load, a source of current for charging said condenser, means for connecting said source of current to said condenser, means for regulating the amount of charge supplied to said condenser, said regulating means being adapted to limit the charging of said condenser to a predetermined level, said source and said regulating means being capable under certain circumstances of charging said condenser above said predetermined level, and means responsive to the charge on said condenser for deenergizing said connecting means, said deenergizing means being adapted to operate at an overcharge of 3% or less above said predetermined level of charge.

8. A condenser welding system comprising a welding load having a critical upper value of energy to be supplied thereto during each welding operation, a condenser adapted to supply welding energy to said welding load, a source of current for charging said condenser, means for connecting said source of current to said condenser, means for regulating the amount of charge supplied to said condenser, said regulating means being adapted to limit the charging of said condenser to a predetermined level below said critical value, said source and said regulating means being capable under certain circumstances of charging said condenser above said critical value, and means responsive to the charge on said condenser for deenergizing said connecting means, said deenergizing means being adapted to operate at an overcharge of 3% or less above said predetermined level of charge and at a point below said critical value.

9. A condenser welding system comprising a welding load adapted to be supplied with a predetermined quantity of energy during each welding operation, a condenser adapted to supply energy to said welding load, a source of current for charging said condenser, means for connecting said source of current to said condenser, means for regulating the voltage to which said condenser is charged, said regulating means being adapted to limit the charging of said condenser to a selected voltage, said source and said regulating means capable under certain conditions of charging said condenser above said selected voltage, means responsive to the voltage on said condenser for deenergizing said connecting means, said deenergizing means being adapted to operate upon charging of said condenser above said selected voltage, and a single means for adjusting said regulating and deenergizing means to select the voltage to which said source and said regulating means charge said condenser and the voltage at which said deenergizing means operates.

10. A condenser charging system comprising a condenser, a source of current for charging said condenser, means for connecting said source of current to said condenser, means for regulating the voltage to which said condenser is charged, means for adjusting the regulating means to select the voltage to which said condenser is charged, said source and regulating means being capable of charging said condenser above the selected voltage, and means responsive to the voltage on said condenser for deenergizing said connecting means at a selected margin above the selected voltage.

11. A condenser charging system comprising a condenser, a source of current for charging said condenser, means for connecting said source of current to said condenser, means for regulating the voltage to which said condenser is charged, means for adjusting the regulating means to select the voltage to which said condenser is charged, said source and regulating means being capable of charging said condenser above the selected voltage, and means responsive to the voltage on said condenser for deenergizing said connecting means at a selected margin above the selected voltage, said margin remaining substantially constant regardless of the selected charge.

12. A condenser charging system comprising a condenser, a source of current for charging said condenser, means for connecting said source of current to said condenser, means for regulating the voltage to which said condenser is charged, means for adjusting the regulating means to select the voltage to which said condenser is charged, said source and regulating means being capable of charging said condenser above the selected voltage, means responsive to the voltage on said condenser for deenergizing said connecting means at a selected margin above any selected voltage, and means for selecting said margin.

13. A condenser charging system comprising a condenser, a source of current for charging said condenser, means for connecting said source of current to said condenser, means for regulating the voltage to which said condenser is charged, means for adjusting the regulating means to select the voltage to which said condenser is charged, said source and regulating means being capable of charging said condenser above the selected voltage, means responsive to the voltage on said condenser for deenergizing said connecting means at a selected margin above any selected voltage, said margin remaining substantially constant regardless of the selected charge, and means for selecting said margin.

14. A condenser charging system comprising a condenser, a source of current for charging said condenser, means for connecting said source of current to said condenser, means for regulating the voltage to which said condenser is charged, said regulating means being capable of being adjusted to select the voltage to which said condenser is charged, said source and regulating means being capable of charging said condenser above the selected voltage, means responsive to the voltage on said condenser for deenergizing said connecting means at a selected margin above a selected voltage, said margin remaining substantially constant regardless of the selected charge, means for selecting said margin, and means for simultaneously and correspondingly adjusting the regulating means and the deenergizing means to select the voltage to which said source and said regulating means charge said condenser and the voltage at which said deenergizing means operates.

15. A condenser charging system comprising a condenser, a source of current for charging said condenser, means for connecting said source of current to said condenser, means for regulating the voltage to which said condenser is charged, said regulating means being adapted to be adjusted to select the voltage to which said condenser is charged, said source and regulating means being capable of charging said condenser above the selected voltage and means responsive to the voltage on said condenser for deenergizing said connecting means, and a single means for simultaneously and correspondingly adjusting the regulating means and deenergizing means to select the voltage to which said source and said regulating means charge said condenser and the voltage at which said deenergizing means operates.

16. A condenser charging system comprising a condenser, a source of current for charging said condenser, a rectifier, means for connecting said source of current to said condenser through said rectifier, means for opening and closing said connecting means, a rectifying tube independent of said rectifier having a control grid, said rectifying tube being adapted upon conduction therein to operate said opening and closing means, and means for deriving a potential from the charge on said condenser and applying at least a portion of said potential to said control grid, said last mentioned means being adapted to apply a cut-off potential to said grid when said condenser is charged to a predetermined level.

JOHN W. DAWSON.

REFERENCES CITED

The following references are of record in the file of this patent:

UNITED STATES PATENTS

| Number | Name | Date |
| --- | --- | --- |
| 2,250,102 | Klemperer | July 22, 1941 |